United States Patent
Chen

(10) Patent No.: US 7,426,421 B2
(45) Date of Patent: Sep. 16, 2008

(54) METHODS AND SYSTEMS FOR TRANSPORT SYSTEM (TS) INTEGRATION

(75) Inventor: Hsieh-Chih Chen, Sanyi Shiang (TW)

(73) Assignee: Taiwan Semicondcutor Manufacturing Co., Ltd., Hsin-Chu (TW)

( * ) Notice: Subject to any disclaimer, the term of this patent is extended or adjusted under 35 U.S.C. 154(b) by 384 days.

(21) Appl. No.: 11/320,054

(22) Filed: Dec. 28, 2005

(65) Prior Publication Data
US 2007/0150901 A1 Jun. 28, 2007

(51) Int. Cl.
*G06F 19/00* (2006.01)
(52) U.S. Cl. .................... 700/112; 700/121
(58) Field of Classification Search ......... 700/112–113, 700/115, 121
See application file for complete search history.

(56) References Cited

U.S. PATENT DOCUMENTS

| | | | | |
|---|---|---|---|---|
| 6,216,051 B1 * | 4/2001 | Hager et al. | | 700/82 |
| 6,516,238 B1 * | 2/2003 | Kim et al. | | 700/112 |
| 6,622,057 B1 * | 9/2003 | Ko et al. | | 700/113 |
| 7,277,774 B2 * | 10/2007 | Yamagishi et al. | | 700/229 |
| 2004/0049398 A1 * | 3/2004 | Gartland et al. | | 705/1 |
| 2005/0246046 A1 * | 11/2005 | Gifford et al. | | 700/112 |

FOREIGN PATENT DOCUMENTS

CN 1278620 * 1/2001

* cited by examiner

*Primary Examiner*—Zoila E Cabrera
(74) *Attorney, Agent, or Firm*—Thomas, Kayden, Horstemeyer & Risley

(57) ABSTRACT

A method for transport system (TS) integration. A request comprising information regarding a manufacturing object is received. A TS server is determined among multiple TS servers contingent upon information regarding which TS server governs the manufacturing object. A command corresponding to the received request is generated. The generated command is issued to the determined TS server.

18 Claims, 6 Drawing Sheets

| Manufacturing Object ID | Transport System Server ID |
|---|---|
| Stocker31479 | TS13 |
| Stocker31877 | TS13 |
| Stocker32650 | TS13 |
| Stocker41111 | TS14 |
| Stocker41222 | TS14 |
| Stocker41333 | TS14 |
| Stocker51345 | TS15 |
| Stocker51723 | TS15 |
| Stocker52311 | TS15 |

FIG. 3

METHODS AND SYSTEMS FOR TRANSPORT SYSTEM (TS) INTEGRATION

BACKGROUND

The invention relates to semiconductor manufacturing, and more particularly, to methods and systems for transport system (TS) integration.

A typical semiconductor fabrication flow for individual products is a highly re-entrant process. Each product flow requires the same equipment resource many times before completion of its production cycle. A conventional semiconductor factory typically includes fabrication tools for various semiconductor wafer processes, such as, photolithography, chemical-mechanical polishing, or chemical vapor deposition. During manufacture, the semiconductor wafer passes through a series of process steps performed by various fabrication tools. For example, in the production of an integrated semiconductor product, the semiconductor wafer passes through up to 600 process steps.

The wafers are typically stored in containers, such as cassettes, each of which holds up to 25 wafers. The cassettes are then loaded into carriers, such as standard mechanical interfaces (SMIFs) or front opening unified pods (FOUPs) for transport throughout the factory. In a 300 mm fab, an automated material handling system (AMHS) is employed to move carriers containing wafer lots from one location to another based on instructions from the MES. Wafer carriers are typically input to the AMHS using automated equipment. Automated equipment is also used to remove wafer carriers using the fabrication tool loadport as the exit point, with the AMHS and/or removal equipment designed to allow several wafer carriers to accumulate near locations while preventing collisions between adjacent wafer carriers.

A manufacturing execution system (MES) connects to the AMHS and follows a series of standard procedural steps to issue commands to an AMHS, and the AMHS accordingly performs particular transport operations, such as movement of wafer carriers from one location to another, and the like, or replies with information, such as stock information in a particular location, and the like. Several AMHSs are typically installed in different fabrication factories. Conventionally, one MES directs a single AMHS, thus, more MESs are required to serve different AMHSs, resulting in increased cost.

SUMMARY

Methods for transport system (TS) integration using a computer are provided. An embodiment of a method for TS integration comprises the following steps: a request comprising information regarding a manufacturing object is received; a TS server is determined among multiple TS servers contingent upon information regarding which TS server governs the manufacturing object. A command corresponding to the received request is generated. The generated command is issued to the determined TS server. The manufacturing object may be a fabrication tool or a stocker. The request may comprise information regarding a request for wafer carrier movement from a first location to the manufacturing object, or from the manufacturing object to a second location. The generated command may be issued to direct a TS corresponding to the determined TS server to move the wafer carrier from the first location to the manufacturing object, or from the manufacturing object to the second location. The request may comprise information regarding a data query request of the manufacturing object, and the generated command may be issued to acquire data corresponding to the manufacturing object.

An embodiment of a method for TS integration may further comprise the following steps. A request type is determined by detecting information comprised in the request. Whether the determined request type is allowed for the determined TS server is determined. When the determined request type is allowed, the generated command is issued to the determined TS server. The request type may be a carrier movement request comprising information regarding the request for wafer carrier movement from a first location to the manufacturing object, or from the manufacturing object to a second location, or a data query request comprising information regarding the data query request of the manufacturing object. The carrier movement request may be disallowed when the determined TS server or the TS corresponding to the determined TS server is unavailable, and the data query request may be disallowed when the determined TS server is unavailable.

An embodiment of a method for TS integration may further comprise the following steps. Whether the determined request type is allowed for the determined TS server is determined by querying the determined TS server. When a returned allowance status indicates that the determined request type is disallowed, or if no allowance status is returned after a time-out expires, that the determined request type is disallowed is determined.

An embodiment of a method for TS integration may further comprise the following steps. Notification information indicating that the determined request type is allowed or disallowed is received from the determined TS server. The received notification information is stored in a storage device. Whether the determined request type is allowed for the determined TS server is determined by acquiring the stored notification information.

The command may be generated in a relevant format corresponding to the determined TS server. An embodiment of a method for TS integration may further comprise the following steps. Reply information corresponding to the issued command is received. The reply information is converted into a relevant format corresponding to a requester. The converted reply information is returned to the requester.

Systems for TS integration are provided. An embodiment of a TS integration system comprises multiple TS servers and a manufacturing execution system (MES). The MES, coupled to the TS servers, receives a request comprising information regarding a manufacturing object, determines a TS server among the TS servers contingent upon information regarding which TS server governs the manufacturing object, generates a command corresponding to the received request and issues the generated command to the determined TS server. The manufacturing object may be a fabrication tool or a stocker. The request may comprise information regarding a request for wafer carrier movement from a first location to the manufacturing object, or from the manufacturing object to a second location. The generated command may be issued to direct a TS corresponding to the determined TS server to move the wafer carrier from the first location to the manufacturing object, or from the manufacturing object to the second location. The request may comprise information regarding a data query request of the manufacturing object, and the generated command may be issued to acquire data corresponding to the manufacturing object.

The MES may further determine a request type by detecting information comprised in the request, determine whether the determined request type is allowed for the determined TS server, and, when the determined request type is allowed, issues the generated command to the determined TS server.

The MES may further determine whether the determined request type is allowed for the determined TS server by querying the determined TS server, and, when a returned allowance status indicates that the determined request type is disallowed, or if no allowance status is returned after a time-out expires, determine that the determined request type is disallowed.

The MES may receive notification information indicating that the determined request type is allowed or disallowed from the determined TS server, store the received notification information in a storage device and determines whether the determined request type is allowed for the determined TS server by acquiring the stored notification information.

The command may be generated in a relevant format corresponding to the determined TS server. The MES may further receive reply information corresponding to the issued command, convert the reply information into a relevant format corresponding to a requester and return the converted reply information to the requester.

BRIEF DESCRIPTION OF THE DRAWINGS

The invention will become more fully understood by referring to the following detailed description of embodiments with reference to the accompanying drawings, wherein:

FIG. 3 is a diagram of exemplary mapping records;

DESCRIPTION

Figure 1:
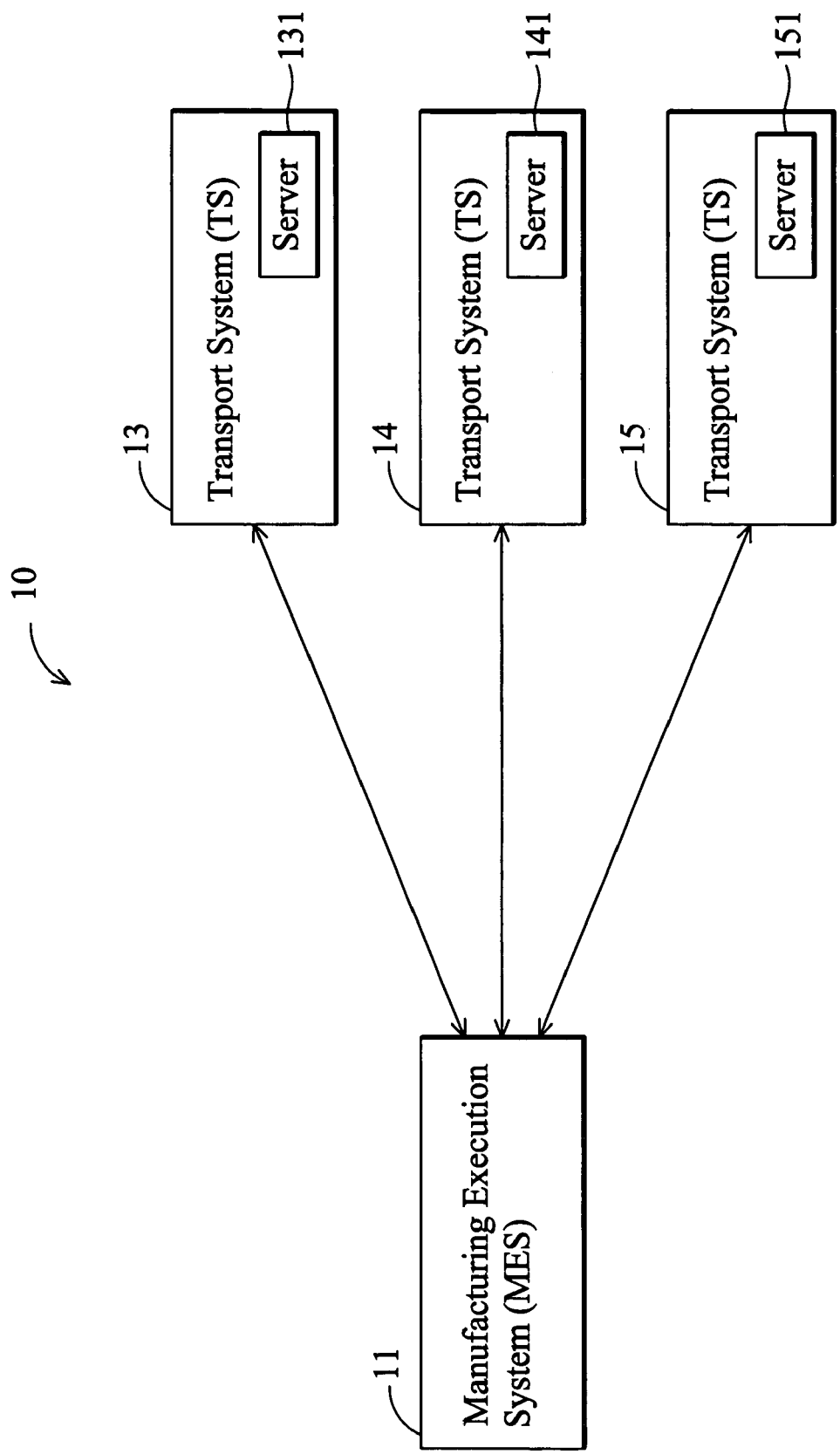
FIG. 1 is a diagram of an embodiment of a transport system (TS) integration system.

FIG. 1 is a diagram of an embodiment of a transport system (TS) integration system 10, comprising a manufacturing execution system (MES) 11 and TSs 13, 14 and 15. MES 11 follows standard procedural steps to direct TSs 13, 14 and 15 to perform various transport movements and to return stock information about one or more particular locations.

The MES 11 may be an integrated computer system representing the methods and software tools used to accomplish production. For example, the primary functions of the MES 11 may include collecting stock data for one or more locations, such as fabrication tools, stockers or others, in real time, organizing and storing the stock data in a centralized database, work order management, fabrication tool management, process management and transport management. Examples of the MES (not shown) include Promis (Brooks Automation Inc. of Massachusetts), Workstream (Applied Materials, Inc. of California), Poseidon (IBM Corporation of New York), SiView (IBM Corporation of New York) and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, SiView and Poseidon may be used for IC fabrication and thin film transistor LCD (TFT-LCD) applications. Fabrication tools typically perform a single wafer fabrication task on the wafers in a given lot. For example, a particular fabrication tool may perform layering, patterning, doping, implanting or heat treatment operations. Stockers provide storage capacity for depositing wafer lots waiting for process or inspection.

The TSs 13, 14 and 15 are employed to move wafer carriers containing wafer lots from one location to another based on instructions from the MES 11. Wafer carriers are typically input to the TSs 13, 14 and 15 using automated equipment. Automated equipment is also used to remove wafer carriers using the fabrication tool or stocker loadports as the exit point, with the TSs 13, 14 and 15 and/or removal equipment designed to allow several wafer carriers to accumulate near locations while preventing collisions between adjacent wafer carriers. Transport system servers 131, 141 and 151, respectively embedded in the TSs 13, 14 and 15, may be an integrated computer system representing the methods and software tools used to accomplish wafer carrier movement and stock information feedback. The transport system servers 131, 141 and 151 preferably provide software services compliant to various proprietary standards specifying transmission protocol, message format and functionality.

Figure 2:
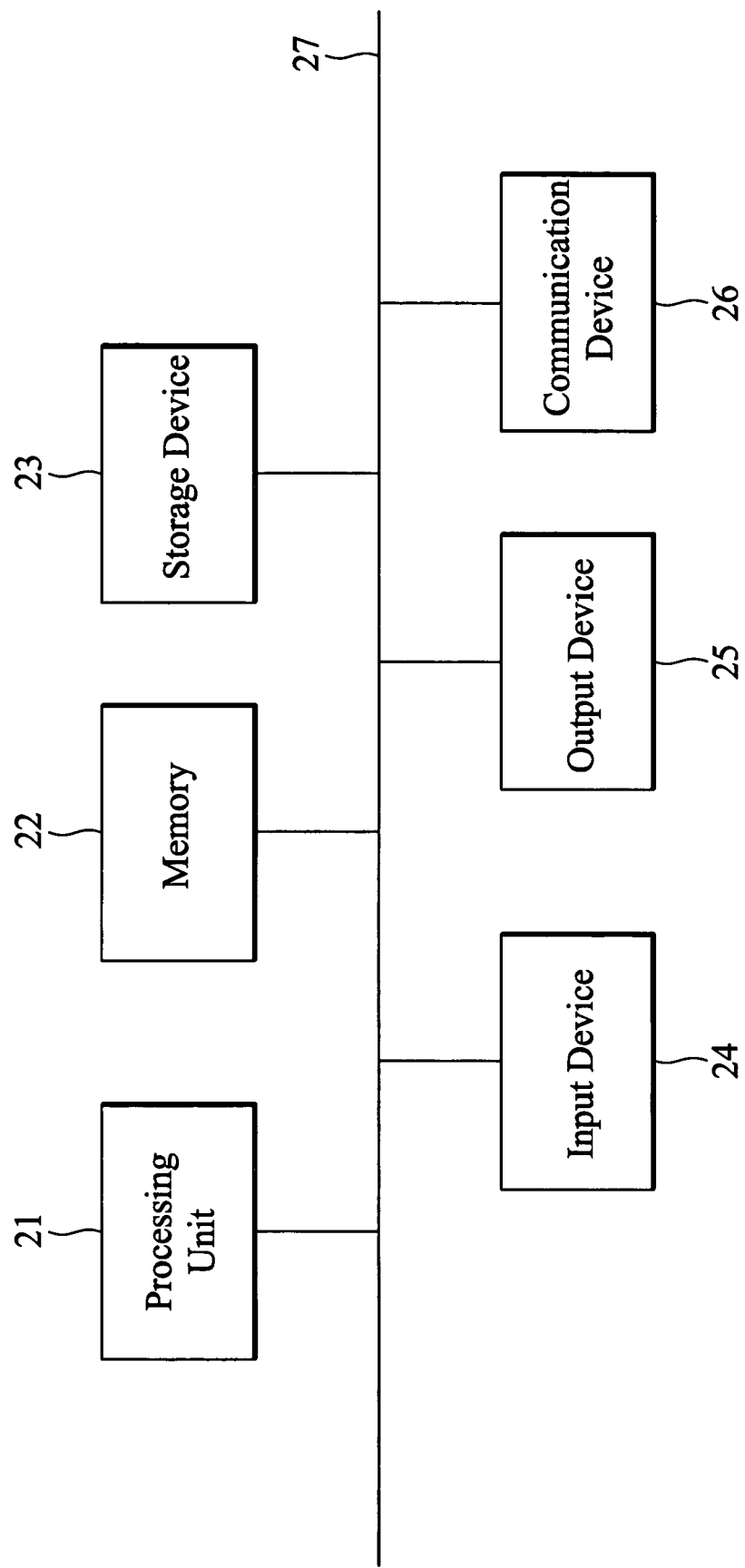
FIG. 2 is a diagram of hardware architecture of an embodiment of a manufacturing execution system (MES) or a TS server.

FIG. 2 is a diagram of hardware architecture of an embodiment of a MES or a TS server, comprising a processing unit 21, memory 22, a storage device 23, an input device 24, an output device 25 and a communication device 26. The processing unit 21 is connected by buses 27 to the memory 22, storage device 23, input device 24, output device 25 and communication device 26 based on Von Neumann architecture. There may be one or more processing units 21, such that the processor of the computer comprises a single central processing unit (CPU), a micro processing unit (MPU) or multiple processing units, commonly referred to as a parallel processing environment. The memory 32 is preferably a random access memory (RAM), but may also include read-only memory (ROM) or flash ROM. The memory 22 preferably stores program modules executed by the processing unit 21 to perform TS integration functions. Generally, program modules include routines, programs, objects, components, or others, that perform particular tasks or implement particular abstract data types. Moreover, those skilled in the art will understand that at least some embodiments may be practiced with other computer system configurations, including handheld devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web object, Web Services or other similar architectures. The storage device 33 may be a hard drive, magnetic drive, optical drive, a portable drive, or nonvolatile memory drive. The drives and their associated computer-readable media (if required) provide nonvolatile storage of computer-readable instructions, data structures or program modules. The communication device 26 may be an Ethernet drive or a wireless network drive compatible with 802.x or GPRS. Those skilled in the art will recognized that more than two of MES 11, TS servers 131, 141 and 151 can be integrated in a single computer.

The storage device 23 stores multiple mapping records. Each mapping record stores information regarding which TS server governs a particular manufacturing object, such as a wafer carrier, a fabrication tool, a stocker and the like. Each mapping record preferably includes two fields, a manufacturing object identity associated with a physical manufacturing object, and a TS server identity associated with a TS server. Those skilled in the art will appreciate that additional or different fields may be provided. The mapping records may be implemented by single or multiple data tables, data objects or data files in a database management system, data object management system, or file management system. A handling TS server identity for a given manufacturing object identity can be effectively acquired by querying the mapping records using various query functions, such as ANSI SQL queries, data object methods, or file manipulation instructions. FIG. 3 is a diagram of exemplary mapping records including nine records 31 to 39. Each mapping record stores information regarding which a particular stocker represented by a manufacturing object identity is governed by which TS server represented by a transport system server identity.

Figure 4:
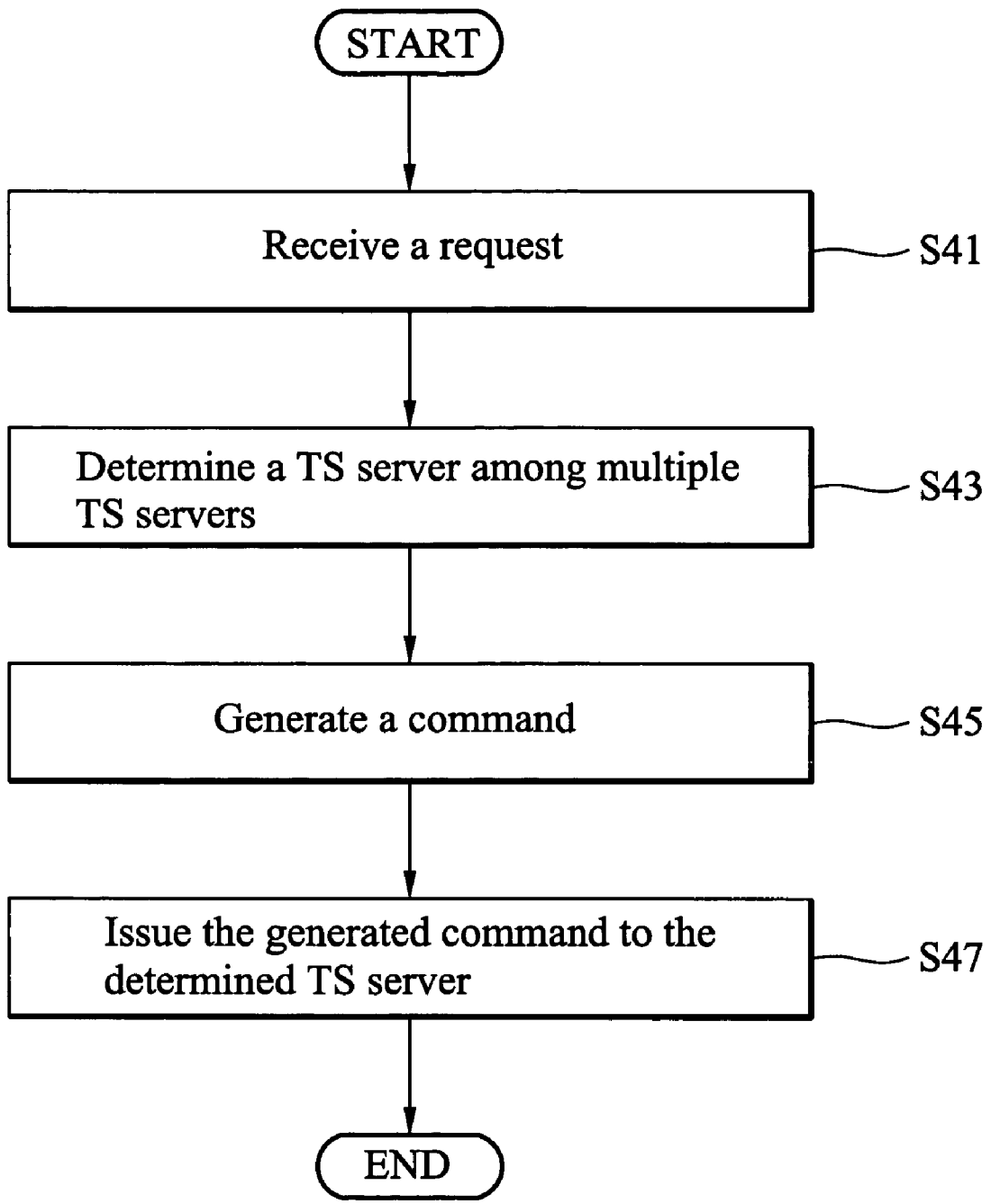
FIGS. 4 and 5 are flowcharts of embodiments of methods of TS integration.

FIG. 4 is a flowchart of an embodiment of a method of TS integration showing steps performed by the MES 11. In step S41, a request comprising information regarding a manufacturing object is received. The manufacturing object may be a fabrication tool or a stocker. The received request may comprise information regarding a request for wafer carrier movement from a first location to the manufacturing object, or from the manufacturing object to a second location, or data query request of the manufacturing object. In step S43, a TS server is determined among multiple TS servers, such as 131, 141 and 151, contingent upon information regarding which TS server governs the manufacturing object. In step S45, a command corresponding to the received request is generated. In step S47, the generated command is issued to the determined TS server. The generated command may be issued to direct a TS corresponding to the determined TS server to move the wafer carrier from the first location to the manufacturing object or from the manufacturing object to the second location. The generated command may be issued to acquire data corresponding to the manufacturing object.

Figure 5:
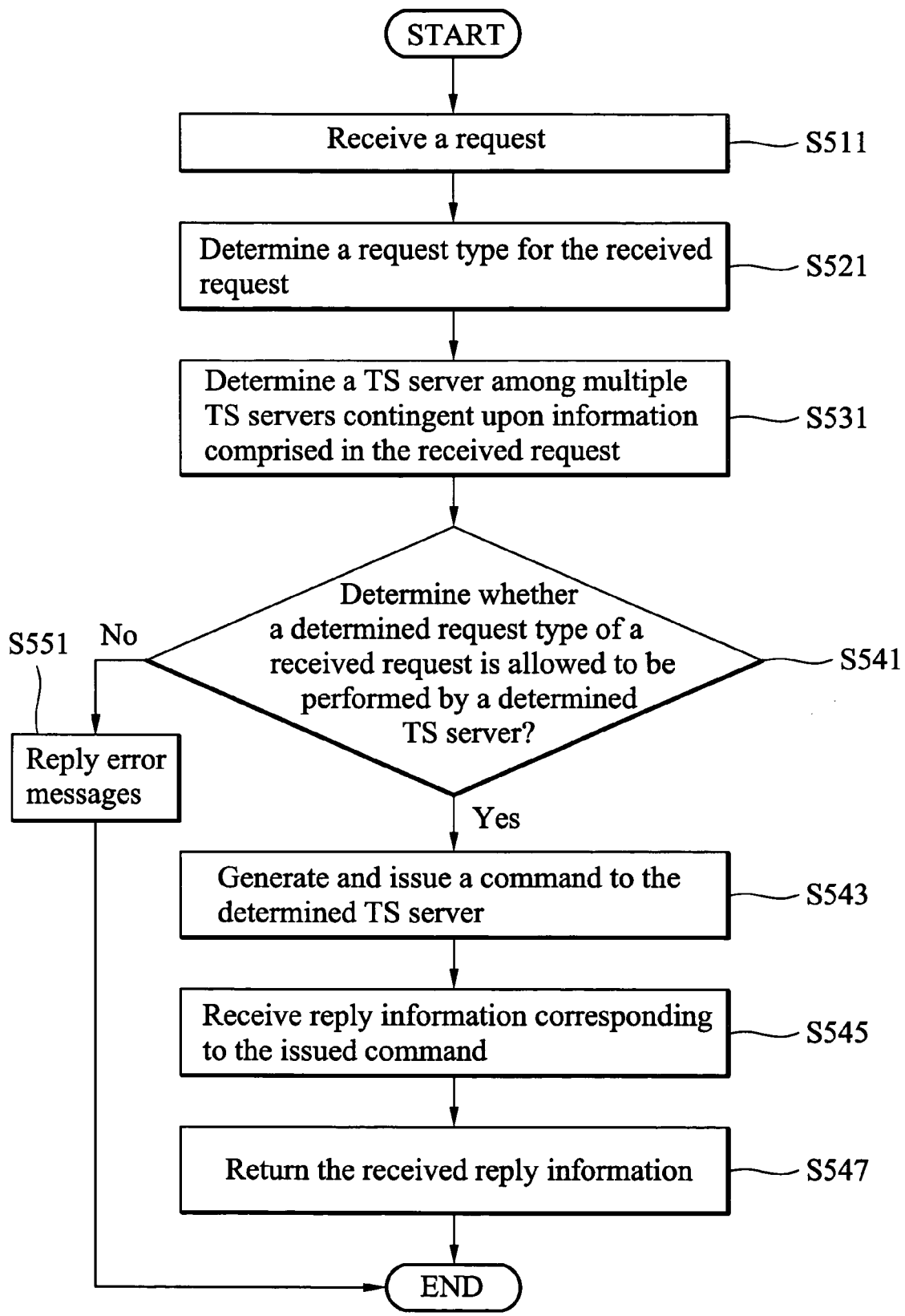

FIG. 5 is a flowchart of an embodiment of a method of TS integration showing steps performed by the MES 11. In step S511, a request is received. The request may be received from a particular application in the MES 11, such as manufacturing scheduling, logistic data management and the like, or a client application in a remote computer (not shown). In step S521, a request type for the received request is determined. Two types of requests, carrier movement and data queries, are supported by the MES to interact with TS servers 131, 141 and 151. Carrier movement requests are utilized to direct TSs 13, 14 and 15 to move wafer carriers from one location, such as a fabrication tool, a stocker and the like, to another via automated equipment. Data query requests are utilized to query data, such as TS status, inventory details or operation status for various locations, such as fabrication tools, stockers or others. The carrier movement requests typically involve automated equipment operations, such as movement of over-head transport railroad, wafer carrier removal from a loadport of a fabrication tool or stocker, or others, and the data query requests are not. The data query requests typically are utilized to retrieve information stored in corresponding TS servers. In step S531, a TS server among multiple TS servers is determined by comparing information provided in the received request with information stored in the mapping records. The acquisition of information provided in the received request can be achieved by parameters carried in the received request. Referring to FIG. 3, for example, when the received request comprises information regarding a movement from a stocker "41111" to a fabrication tool, TS server "TS14" is determined. Alternatively, when the received request comprises information regarding an inventory data query for a stocker "51345", TS server "TS15" is determined.

In step S541, it is determined whether the determined request type of the received request is allowed by the determined TS server, and, if so, the process proceeds to step S543, and otherwise, to step S551. Carrier movement requests may be disallowed when a corresponding TS server or automated equipment in TS suffers or stops to upgrade. Data query requests may be disallowed when a corresponding TS server unexpectedly shuts down or stops to upgrade. Two approaches may be utilized to check such allowance status. In one approach, the MES 11 may query the determined TS server to acquire allowance status for the determined request type of the received request by executing the provided software services therein. The determined request type is disallowed when the returned allowance status of the determined request type indicates disallowed, or if no allowance status is returned after a time-out expires. In another approach, the allowance status of request types may be notified by corresponding TS servers in real-time to indicate a particular request type is allowed or disallowed, and the MES 11 immediately stores the notification information in the storage device 23 for further verification. Thus, the allowance status determination for the determined request type may be achieved by querying the corresponding TS server or acquiring the notification information from the storage device 23.

In step S543, at least one command corresponding to the received request is generated and issued to the determined TS server. The generated command may direct the determined TS server to move a particular wafer carrier from one location to another or reply with inventory data for a particular location. Note that the command is generated in relevant format, such as command name, argument alignments, argument data types, command execution protocols when the generated commands are more than two and required to interact with the determined TS server and the like, corresponding to the provided software services therein. In step S454, reply information corresponding to the issued command is received. For example, movement status, such as success or failure, corresponding to issued carrier movement command, or replied data corresponding to the issued data query command may be received. In step S547, the received reply information is returned to the requester. Note that the reply information may be converted into relevant format corresponding to the requester, such as a particular application in the MES 11 or a client application in a remote computer (not shown). In step S551, an error message indicating that the request is disallowed by the determined TS server is returned to the requester.

Figure 6:
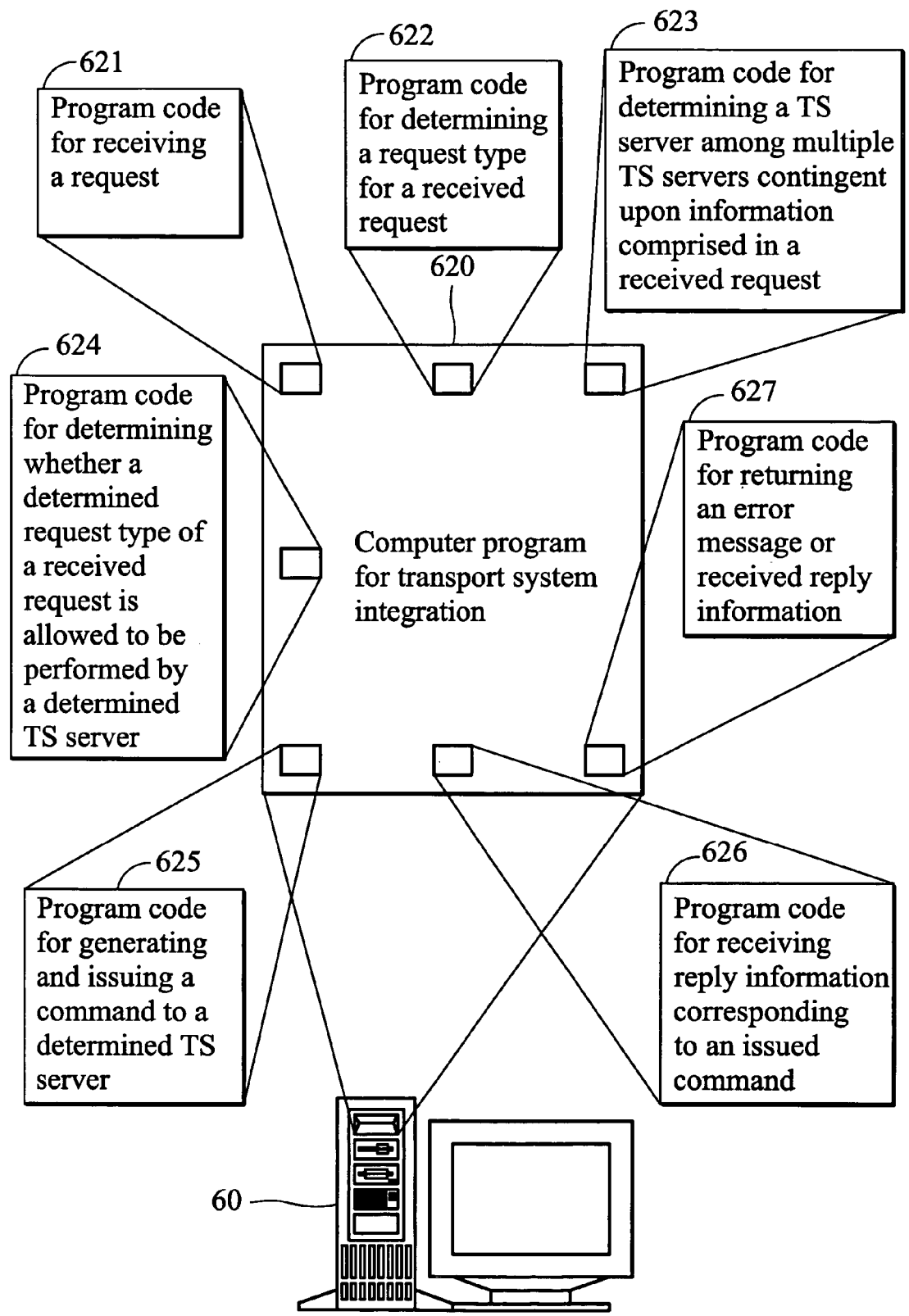
FIG. 6 is a diagram of a storage medium storing a computer program providing an embodiment of a method of TS integration.

Also disclosed is a storage medium as shown in FIG. 6 storing a computer program 620 providing the disclosed method of TS integration performed by the MES 11. The computer program product includes a storage medium 60 having computer readable program code embodied therein. The computer readable program code comprises at least computer readable program code 621 receiving a request, computer readable program code 622 determining a request type for a received request, computer readable program code 623 determining a TS server among multiple TS servers contingent upon information comprised in a received request, computer readable program code 624 determining whether a determined request type of a received request is allowed to be performed by a determined TS server, computer readable program code 625 generating and issuing a command to a determined TS server, computer readable program code 626 receiving reply information corresponding to an issued command and computer readable program code 627 returning an error message or received reply information.

The methods and systems of the embodiments, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in terms of preferred embodiment, it is not intended to limit thereto. Those skilled in the technology can still make various alterations and modifications without departing from the scope and spirit of this invention. Therefore, the scope of the present invention shall be defined and protected by the following claims and their equivalents.

What is claimed is:

1. A method of transport system (TS) integration comprising using a computer to perform the steps of:
   receiving a request comprising information regarding a manufacturing object;
   determining a request type of the request by detecting information comprised in the request;
   determining a TS server among a plurality of TS servers contingent upon information regarding which TS server governs the manufacturing object;
   determining whether the determined request type is allowed for the determined TS server;
   generating a command corresponding to the received request; and
   when the determined request type is allowed, issuing the generated command to the determined TS server.

2. The method of claim 1 wherein the manufacturing object is a fabrication tool or a stocker, the request comprising information regarding a request for wafer carrier movement from a first location to the manufacturing object, or from the manufacturing object to a second location, and the generated command is issued to the determined TS server to direct a TS corresponding to the determined TS server to move the wafer carrier from the first location to the manufacturing object or from the manufacturing object to the second location.

3. The method of claim 1 wherein the manufacturing object is a fabrication tool or a stocker, the request comprising information regarding a data query request of the manufacturing object, and the generated command is issued to the determined TS server to acquire data corresponding to the manufacturing object.

4. The method of claim 1, wherein the request type is a carrier movement request comprising information regarding a request for wafer carrier movement from a first location to the manufacturing object, or from the manufacturing object to a second location, or a data query request comprising information regarding data query request of the manufacturing object.

5. The method of claim 4 wherein the carrier movement request is disallowed when the determined TS server or the TS corresponding to the determined TS server is unavailable, and the data query request is disallowed when the determined TS server is unavailable.

6. The method of claim 4 further comprising:
   determining whether the determined request type is allowed for the determined TS server by querying the determined TS server; and
   determining that the determined request type is disallowed when a returned allowance status indicates that the determined request type is disallowed, or if no allowance status is returned after a time-out expires.

7. The method of claim 4 further comprising:
   receiving notification information indicating that the determined request type is allowed or disallowed from the determined TS server;
   storing the received notification information in a storage device; and
   determining whether the determined request type is allowed for the determined TS server by acquiring the stored notification information.

8. The method of claim 1 wherein the command is generated in a relevant format corresponding to the determined TS server.

9. The method of claim 8 further comprising:
   receiving reply information corresponding to the issued command;
   converting the reply information into a relevant format corresponding to a requester; and
   returning the converted reply information to the requester.

10. A system of transport system (TS) integration comprising:
    a plurality of TS servers; and
    a manufacturing execution system (MES) coupled to the TS servers, receiving a request comprising information regarding a manufacturing object, determining a request type of the request by detecting information comprised in the request, determining a TS server among the TS servers contingent upon information regarding the manufacturing object is governed by which TS server, determining whether the determined request type is allowed for the determined TS server, generating a command corresponding to the received requests and, when the determined request type is allowed, issuing the generated command to the determined TS server.

11. The system of claim 10 wherein the manufacturing object is a fabrication tool or a stocker, the request comprising information regarding a request for wafer carrier movement from a first location to the manufacturing object, or from the manufacturing object to a second location, and the generated command is issued to the determined TS server to direct a TS corresponding to the determined TS server to move the wafer carrier from the first location to the manufacturing object or from the manufacturing object to the second location.

12. The system of claim 10 wherein the manufacturing object is a fabrication tool or a stocker, the request comprising information regarding a data query request of the manufacturing object, and the generated command is issued to the determined TS server to acquire data corresponding to the manufacturing object.

13. The system of claim 10 wherein the request type is a carrier movement request comprising information regarding a request for wafer carrier movement from a first location to the manufacturing object, or from the manufacturing object to a second location, or a data query request comprising information regarding data query request of the manufacturing object.

14. The system of claim 13 wherein the carrier movement request is disallowed when the determined TS server or the TS corresponding to the determined TS server is unavailable, and the data query request is disallowed when the determined TS server is unavailable.

15. The system of claim 13 wherein the MES determines whether the determined request type is allowed for the determined TS server by querying the determined TS server, and, when a returned allowance status indicates that the determined request type is disallowed, or if no allowance status is returned after a time-out expires, determines that the determined request type is disallowed.

16. The system of claim 13 wherein the MES receives notification information indicating that the determined request type is allowed or disallowed from the determined TS server, stores the received notification information in a storage device and determines whether the determined request type is allowed for the determined TS server by acquiring the stored notification information.

17. The system of claim 10 wherein the command is generated in a relevant format corresponding to the determined TS server.

18. The system of claim 17 wherein the MES receives reply information corresponding to the issued command, converts the reply information into a relevant format corresponding to a requester and returns the converted reply information to the requester.

* * * * *